United States Patent [19]

Scobbo, Jr. et al.

[11] Patent Number: 5,264,487
[45] Date of Patent: Nov. 23, 1993

[54] COMPOSITIONS DERIVED FROM RECYCLED POLYMERS

[75] Inventors: James J. Scobbo, Jr., Guilderland; Michael P. Laughner, Clifton Park, both of N.Y.; Marinus E. J. Dekkers, Parkersburg, W. Va.

[73] Assignee: General Electric Company, Schenectady, N.Y.

[21] Appl. No.: 888,073

[22] Filed: May 26, 1992

Related U.S. Application Data

[63] Continuation-in-part of Ser. No. 716,174, Jun. 17, 1991, abandoned.

[51] Int. Cl.$^5$ .................... C08L 71/12; C08L 55/02; C08J 11/04
[52] U.S. Cl. .......................... 525/68; 521/41; 521/45.5; 525/133; 525/396; 525/905
[58] Field of Search ............ 521/40, 41, 45.5; 525/54, 68, 396, 905

[56] References Cited

U.S. PATENT DOCUMENTS

| | | | |
|---|---|---|---|
| 3,383,435 | 5/1968 | Cizek | 525/132 |
| 4,427,818 | 1/1984 | Prusinski | 524/442 |
| 4,444,950 | 4/1984 | Sakano et al. | 525/67 |
| 4,454,284 | 6/1984 | Ueno et al. | 524/427 |
| 4,554,316 | 11/1985 | Sakano et al. | 525/71 |
| 4,578,423 | 3/1986 | Deets et al. | 525/68 |
| 4,599,380 | 7/1986 | Ueda et al. | 525/68 |
| 4,987,165 | 1/1991 | Orikasa et al. | 525/64 |
| 5,006,610 | 4/1991 | Nakamura et al. | 525/65 |
| 5,030,662 | 7/1991 | Banerjie | 521/43.5 |
| 5,068,286 | 11/1991 | Campbell et al. | 525/92 |
| 5,073,416 | 12/1991 | Avakian et al. | 428/412 |

FOREIGN PATENT DOCUMENTS

| | | |
|---|---|---|
| 0442102 | 8/1991 | European Pat. Off. |
| 2143085 | 2/1973 | France. |
| 9102767 | 3/1991 | PCT Int'l Appl. |

*Primary Examiner*—James J. Seidleck
*Assistant Examiner*—Thomas Hamilton, III
*Attorney, Agent, or Firm*—William H. Pittman

[57] ABSTRACT

Resinous compositions are prepared by blending an ABS copolymer or similar addition polymer, a polyphenylene ether-polystyrene blend, and a copolymer of an olefin such as ethylene and an epoxy compound such as glycidyl methacrylate. The first two constituents may be scrap materials. The resulting compositions have high impact strength and other advantageous properties.

17 Claims, No Drawings

COMPOSITIONS DERIVED FROM RECYCLED POLYMERS

This application is a continuation-in-part of copending application Ser. No. 07/716,174, now abandoned.

This invention relates to recycled thermoplastic resins, and more particularly it relates to blends of a copolymer derived from an alkenylaromatic compound and a polymerizable nitrile and a composition comprising polyphenylene ether and poly(alkenylaromatic) resins.

Countless pounds of plastic in the form of business machines, automobile interiors and the like are being sold to consumers every day. This results in hundreds of millions of pounds of non-biodegradable thermoplastic and some thermoset resin scrap that must be disposed of each year. For environmental reasons, it would be highly desirable to find additional uses for this large and ever growing amount of plastic waste, such as recycle of the scrap resin into useful products.

Often the discarded items are made from incompatible resins. For example, business machines sold by one company may have housings made from an ABS (acrylonitrile-butadiene-styrene) resin, while business machines sold by another company may have housings made from a polyphenylene ether/polystyrene blend, the two of which are incompatible materials. For economic and environmental reasons, it would be desirable to find ways to process such incompatible scrap resins without sorting.

Therefore, the present invention provides a composition prepared from the incompatible plastic resin, both virgin and scrap, capable of being molded into shaped articles which exhibit excellent mechanical properties.

In one of its aspects, the present invention is a method for preparing a resinous composition which comprises blending under reactive conditions:

(A) a virgin or scrap copolymer of at least one alkenylaromatic monomer, at least one of acrylonitrile and methacrylonitrile and at least one aliphatic diene;

(B) a virgin or scrap thermoplastic composition comprising at least one polyphenylene ether resin and at least one poly(alkenylaromatic) resin; and (C) a copolymer of at least one ethylenically unsaturated epoxy compound and at least one olefin;

the proportions of components A and B each being in the range of about 1–95% and the proportion of component C in the range of about 5–40% by weight, based on the total of A and B. Another aspect of the invention is compositions prepared by said method.

Component A according to the present invention is a copolymer of at least one alkenylaromatic monomer, at least one of acrylonitrile and methacrylonitrile and at least one aliphatic diene. Said copolymer may be virgin (i.e., freshly prepared) or a scrap or recycled copolymer. The invention is particularly advantageous for use with scrap copolymers of this type, by reason of its capability of improving the properties of blends containing such scrap polymers.

Illustrative of the alkenylaromatic units which may be present in component A are those having the formula

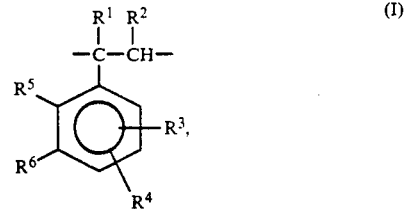

wherein each of $R^1$ and $R^2$ is hydrogen or $C_{1-6}$ alkyl, each of $R^3$ and $R^4$ is independently chloro, bromo, hydrogen or $C_{1-6}$ alkyl, and each of $R^5$ and $R^6$ is independently hydrogen or $C_{1-6}$ alkyl or $R^5$ and $R^6$ together with the atoms to which they are attached form a fused benzene ring. Suitable alkenylaromatic compounds include, for example, styrene and its analogs, such as a-methyl styrene, chloro- and bromostyrenes, 3,5 dimethylstyrene and t-butylstyrene.

Also present in component A are units derived from at least one aliphatic diene such as butadiene, isoprene or chloroprene. Butadiene is usually preferred.

Other structural units may also be present in component A. They include units derived from such ethylenically unsaturated monomers as methyl methacrylate, methyl acrylate, acrylic acid, methacrylic acid, acrylamide, methacrylamide, vinyl chloride, ethyl vinyl ether and maleic anhydride.

Polymers useful as component A may be prepared by methods well known in the art, including emulsion, bulk and melt polymerization. A common method for preparing such polymers includes a first step of polymerizing the diene monomer or monomers in emulsion to form a latex, and subsequent grafting of the alkenylaromatic and nitrile monomers and any other monomers on said latex, also in emulsion.

The resulting graft copolymer generally contains diene structural units in the amount of about 5–30% by weight, with the balance being grafted moieties containing the other structural units. Grafted structural units derived from the alkenylaromatic compound and nitrile generally comprise about 65–80% and about 20–35%, respectively, by weight of total grafted units. Other monomer units, if present, constitute up to about 20% of total grafted units.

Component B is a virgin or scrap thermoplastic composition, also preferably scrap. It comprises a polyphenylene ether resin and a poly(alkenylaromatic) resin, the latter of which typically comprises structural units of formula I.

The polyphenylene ethers are known polymers comprising a plurality of structural units of the formula

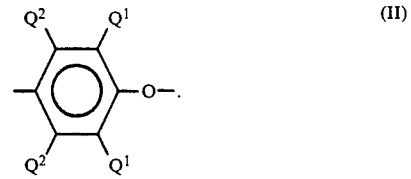

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial porportion of free OH groups remains.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The poly(alkenylaromatic) resin comprises structural units of formula I hereinabove, optionally in combination with other units. Included are rubber-modified polystyrenes. Suitable modifiers include natural and synthetic rubbers such as polyisoprene, polybutadiene, polychloroprene, ethylene-$C_{3-10}$ monoolefin-diene terpolymers (EPDM rubber), styrene-butadiene copolymers (SBR rubber), styrene-acrylonitrile copolymers (SAN), ethylene-propylene copolymers (EP rubbers), polyurethane rubbers, and polyorganosiloxane (silicone) rubbers. The rubber content will generally be up to about 45 percent by weight, depending on the particular requirements of impact resistance modification desired.

Since polyphenylene ethers and poly(alkenylaromatic) resins are miscible in all proportions, the proportions thereof in component B are not critical. In general, weight ratios of poly(alkenylaromatic) resin and polyphenylene ether are between about 5:95 and 95:5.

Component C is a copolymer of at least one ethylenically unsaturated epoxy compound and at least one olefin. The olefins are illustrated by ethylene, propylene and 1-butene, with ethylene being preferred.

Suitable epoxy structural units in component C include those having the formula

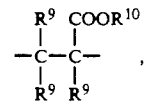

wherein $R^{10}$ is a radical containing an epoxy group and each $R^9$ is independently hydrogen, $C_{1-8}$ alkyl, $C_{6-13}$ cycloalkyl or aryl, or aralkyl. Such compounds include glycidyl ethers of unsaturated alcohols such as allyl glycidyl ether, glycidyl ethers of alkenylphenols such as vinylphenyl glycidyl ether, vinyl and allyl esters of epoxy carboxylic acids such as vinyl epoxystearate, and glycidyl esters of unsaturated carboxylic acids, e.g., glycidyl methacrylate, glycidyl 2-ethylacrylate, glycidyl 2-propylacrylate and glycidyl acrylate. Glycidyl methacrylate (GMA) is preferred.

Component C may also contain units derived from other ethylenically unsaturated monomers, especially vinyl esters as illustrated by vinyl acetate.

The proportions of structural units in component C will generally be about 70–95% olefin units and about 5–30% epoxy-containing units, by weight of said component. If other units are present, they will generally be in the amount of about 2–10%.

As previously mentioned, the proportions of components A and B are each in the range of about 1–95% by weight; preferred proportions are about 50–75% A and about 25–50% B. The proportion of component C, on the same basis, is in the range of about 5–40%; it is preferably about 5–15% since impact strengths of the compositions of the invention are often maximized in that range.

Components A and B may optionally also comprise up to about 40 percent by weight of filler material. Suitable filler materials include particulate and fibrous reinforcing agents, preferably glass fibers.

According to the invention, components A, B and C are blended under reactive conditions. Such conditions may comprise solution or melt blending, typically at temperatures in the range of about 200°–300° C. Melt blending is usually preferred by reason of its particular applicability and the availability of melt blending equipment in polymer processing facilities. Conventional melt blending apparatus of both the batch and continuous type may be employed. Typically, melt blending is effected by extrusion.

The invention is illustrated by the following examples. All parts, proportions and percentages are by weight.

EXAMPLES 1-4

Two reclaimed (scrap) polymer compositions were employed: an ABS copolymer and a blend of poly(2,6-dimethyl-1,4-phenylene ether) and polystyrene. The precise natures and proportions of structural units and polymers in these compositions are not known with certainty, since they were recovered from previous use. However, said proportions are known to be within the broad definitions provided hereinabove.

The two polymer compositions were blended in a 2:1 ratio of ABS to polyphenylene ether-polystyrene, and the blend was granulated and extruded with either of two commercially available copolymers containing ethylene and glycidyl methacrylate units and, in Examples 3 and 4, vinyl acetate units. Extrusion was conducted in a twin screw extruder at about 250° C. The extrudates were pelletized and dried at 85° C., and the dried blends were injection molded at about 250° C. into test specimens which were evaluated for tensile elongation and impact properties, in comparison with a control containing only the ABS and polyphenylene ether-polystyrene blend. The results are given in the following table.

|  | Example | | | | Control |
|---|---|---|---|---|---|
|  | 1 | 2 | 3 | 4 |  |
| Component C: |  |  |  |  |  |
| Ethylene units | 88 | 88 | 83 | 83 | — |
| Glycidyl methacrylate units | 12 | 12 | 12 | 12 | — |
| Vinyl acetate units | — | — | 5 | 5 | — |
| Percent (based on A + B + C) | 10 | 20 | 10 | 20 | — |
| Tensile elongation, % | 20 | 39 | 15 | 65 | 17 |
| Notched Izod impact strength, joules/m. | 59 | 43 | 59 | 48 | 37 |

It will be apparent that the impact strengths of the compositions of this invention are substantially higher than that of the control, and tensile elongations are generally higher or at least equivalent. Maximum impact strengths are obtained when the proportion of component C is in the preferred 5-15% range.

What is claimed is:

1. A method for preparing a resinous composition which comprises blending under reactive conditions:
   (A) a scrap copolymer of at least one alkenylaromatic monomer, at least one of acrylonitrile and methacrylonitrile and at least one aliphatic diene;
   (B) a scrap thermoplastic composition comprising at least one polyphenylene ether resin and at least one poly(alkenylaromatic) resin; and
   (C) a copolymer of at least one ethylenically unsaturated epoxy compound and at least one olefin;
   the proportions of components A and B each being in the range of about 1-95% and the proportion of component C in the range of about 5-40% by weight, based on the total of A and B.

2. A method according to claim 1 wherein component A is an ABS copolymer.

3. A method according to claim 1 wherein the polyphenylene ether resin is a poly(2,6-dimethyl-1,4-phenylene ether).

4. A method according to claim 1 wherein the poly(alkenylaromatic) resin comprises structural units of the formula

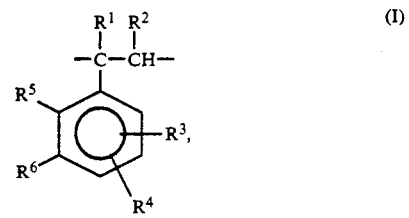

wherein each of $R^1$ and $R^2$ is hydrogen or $C_{1-6}$ alkyl, each of $R^3$ and $R^4$ is independently chloro, bromo, hydrogen or $C_{1-6}$ alkyl, and each of $R^5$ and $R^6$ is independently hydrogen or $C_{1-6}$ alkyl or $R^5$ and $R^6$ together with the atoms to which they are attached form a fused benzene ring.

5. A method according to claim 4 wherein the poly(alkenylaromatic) resin is a polystyrene.

6. A method according to claim 1 wherein component C is an ethylene copolymer.

7. A method according to claim 6 wherein component C also contains glycidyl methacrylate units.

8. A method according to claim 7 wherein component C also contains vinyl acetate units.

9. A method according to claim 6 wherein component C is present in the amount of about 5-15% by weight.

10. A method according to claim 1 wherein melt blending at a temperature in the range of about 200°-300° C. is employed.

11. A composition prepared by the method of claim 2.
12. A composition prepared by the method of claim 3.
13. A composition prepared by the method of claim 5.
14. A composition prepared by the method of claim 7.
15. A composition prepared by the method of claim 8.
16. A composition prepared by the method of claim 9.

17. A resinous composition prepared by melt extruding, at a temperature in the range of about 200°-300° C.:
   (A) a scrap ABS copolymer;
   (B) a scrap thermoplastic composition comprising a poly(2,6-dimethyl-1,4-phenylene ether) and at least one polystyrene; and
   (C) a copolymer comprising about 70-95% by weight ethylene units and about 5-30% glycidyl methacrylate units, and, optionally, about 2-10% vinyl acetate units;
   the proportions of components A and B being about 50-75% and about 25-50%, respectively, and the proportion of component C in the range of about 5-15% by weight, based on the total of A and B.

* * * * *